United States Patent [19]

Simpson

[11] 3,724,874
[45] Apr. 3, 1973

[54] VEHICLE DRAWBAR ASSEMBLY
[76] Inventor: Glenn Simpson, Pocahontas, Iowa 50574
[22] Filed: July 30, 1971
[21] Appl. No.: 167,776

[52] U.S. Cl..................280/408, 280/478, 180/14 R
[51] Int. Cl............................B60d 1/18, B62d 53/00
[58] Field of Search......280/479 R, 477, 478 A, 408, 280/478 R

[56] References Cited
UNITED STATES PATENTS

| 2,306,231 | 12/1942 | Smith | 280/479 R X |
| 2,794,657 | 6/1957 | Anderson | 280/477 |
| 3,057,644 | 11/1962 | Fisher | 280/478 A |
| 3,521,908 | 7/1970 | Carter | 280/479 R |

Primary Examiner—Leo Friaglia
Attorney—Roy G. Story

[57] ABSTRACT

A drawbar assembly for hitching two trailers together is composed of the following combination: (1) a hollow, rectangular, drawbar receiver for attaching to the rear axle of the first trailer; (2) a portable drawbar attachable to the tongue of the second trailer and movable into the receiver; and (3) a flexible dragline attachable at one end to the drawbar, thence running through the receiver and under the first trailer and attachable at the other end to a tractor for pulling the drawbar into the receiver; the combination having stopping and locking means for holding the drawbar in the receiver.

4 Claims, 8 Drawing Figures

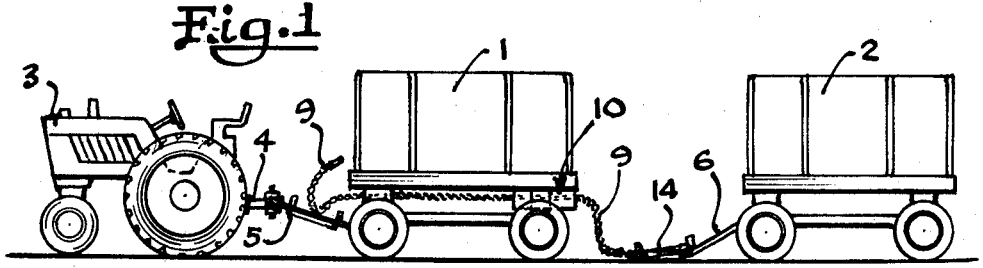
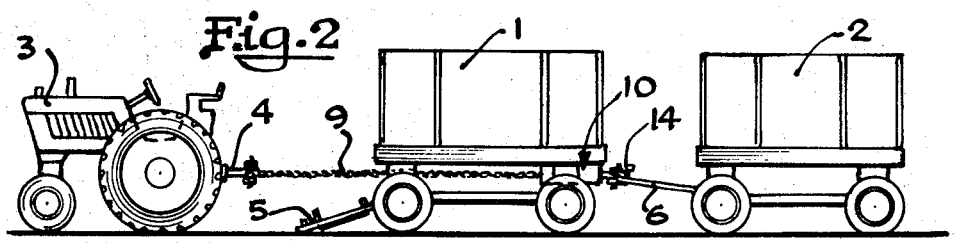
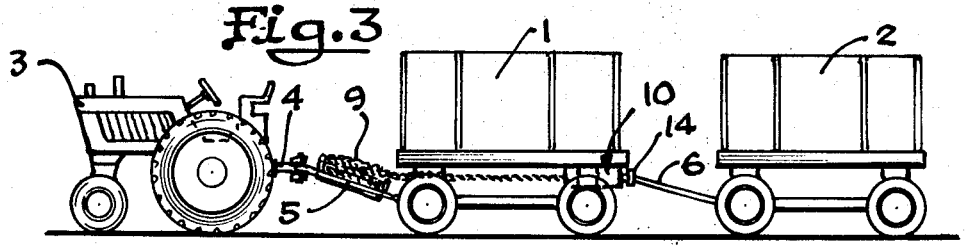
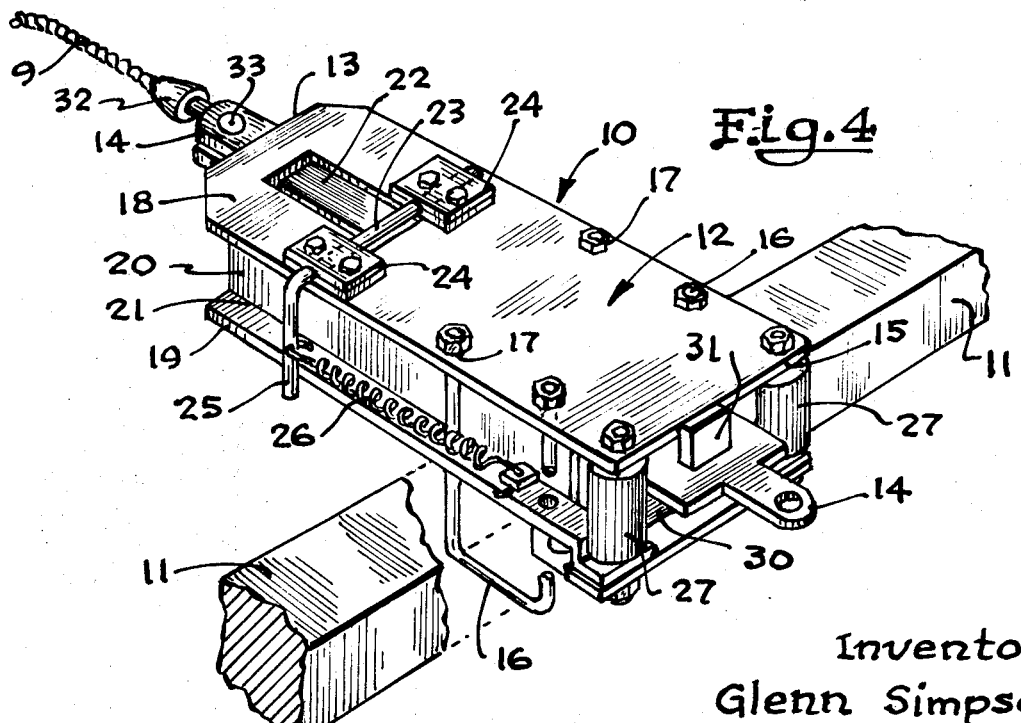
Inventor
Glenn Simpson
By Roy G. Story
Attorney

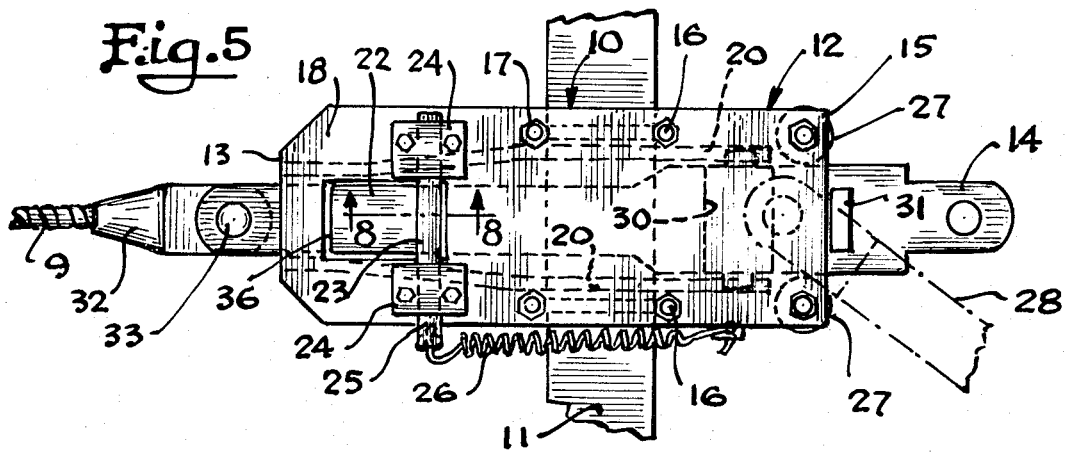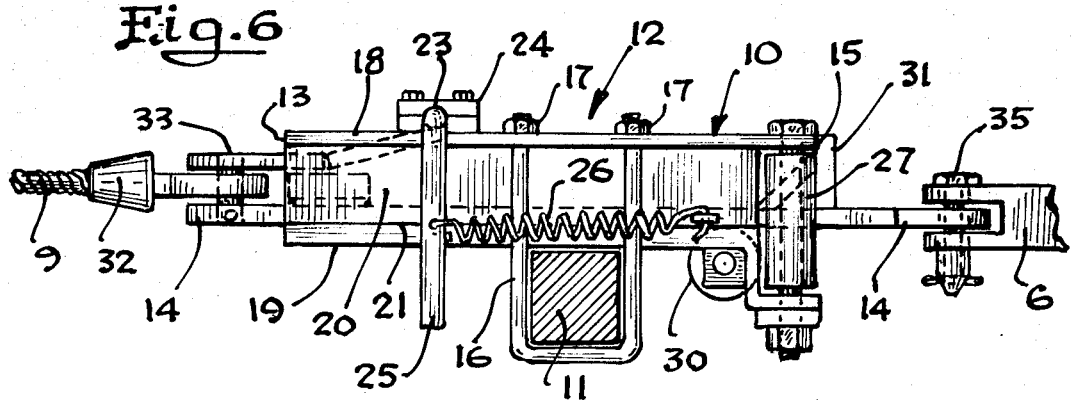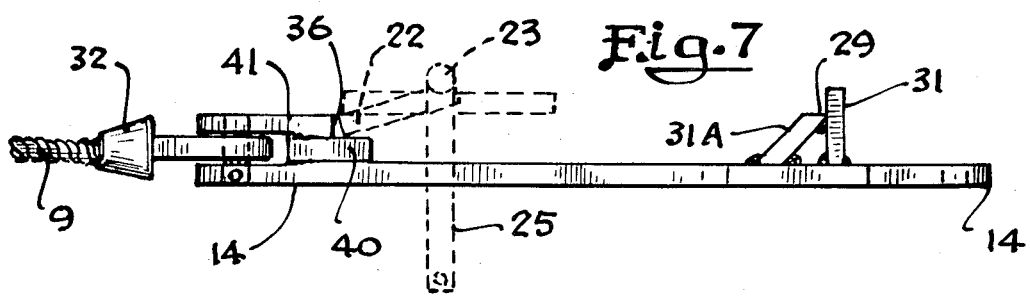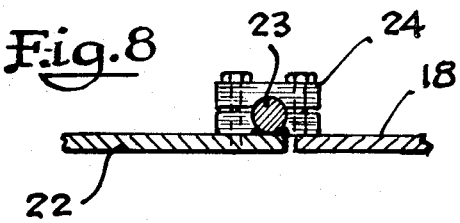

VEHICLE DRAWBAR ASSEMBLY

This invention relates to a vehicle drawbar assembly for connecting a draft vehicle to a plurality of trailing vehicles and more particularly to such an assembly wherein a movable drawbar for connecting to a trailing vehicle is moved into locking position with a receiver affixed to a leading vehicle by a dragline or towline operated by the draft vehicle.

It is common practice in hitching two trailers together for travel in the field or on the road to connect the tractor to the first trailer and then drive both vehicles to a position ahead of the second trailer. The operator then reverses the travel and backs the rear end of the first trailer into close proximity to the tongue of the second trailer. A second operator aligns the tongue of the second trailer with a drawbar secured to the rear axle of the first trailer. As the first trailer moves rearwardly, the second operator places the hitch pin through the aperatures in the tongue of the second trailer and the hitch of the first trailer when the aperatures become aligned. The procedure requires considerable skill of the tractor operator in backing a four wheel trailer into the necessary position for securing the alignment and hitching of the two trailers. Also, the second operator during the procedure not only is exposed in a dangerous position behind and under the body of the first trailer traveling in reverse to a point where the hitch pin can be inserted, but also he must exert much manual force to align the tongue of one trailer with the drawbar or hitch of the other trailer.

An object of the present is to provide a means for hitching trailer vehicles together by one operator.

Another object is to provide means for hitching two trailers together without reverse travel of the draft vehicle and the first trailer.

Another object is to provide means whereby alignment of the trailers to be hitched can be safely accomplished by a single operator of the draft vehicle.

Another object is to provide a traveling drawbar for moving the second trailer into hitching position with the first trailer.

Another object is to provide a receiver to be attached to the first trailer for receiving and locking the drawbar.

Also an object of the invention is to provide a dragline for operating the traveling drawbar by the draft vehicle.

The advantages and objects of the invention will become more apparent from the following description read in connection with the accompanying drawings in which:

FIG. 1 is a side view of a tractor and two trailers equipped with the drawbar assembly, the traveling drawbar and dragline being pulled out from the receiver on the rear axle of the first trailer and attached to the tongue of the second trailer.

FIG. 2 is a view similar to FIG. 1 showing the dragline connected to the tractor and the tractor driven ahead to pull the drawbar into locking position with the receiver.

FIG. 3 is a view similar to FIG. 2 with the tractor reconnected to the tongue of the first trailer and the slack of the dragline coiled up and secured on the tongue.

FIG. 4 is a view in perspective of the drawbar assembly and a fragment of the rear axle of a trailer on which the assembly is mounted.

FIG. 5 is a top plan view of the drawbar assembly showing the drawbar in alternate positions entering the receiver.

FIG. 6 is a longitudinal section through the drawbar assembly.

FIG. 7 is a longitudinal side view of the drawbar and dragline with the drawbar in vertical section.

FIG. 8 is a sectional view along the line 8—8 of FIG. 5.

In accordance with the invention, the drawbar assembly comprises a receiver, a drawbar and a dragline. The receiver is attached to the rear axle of the first trailer. The drawbar is detachable from the receiver and can be moved about for connecting to the second trailer. The dragline is fastened at one end to the drawbar, threaded through the receiver and the other end connected to the draft vehicle. When the dragline is connected to a tractor, for example, and the tractor driven forward, the second trailer is pulled toward the first trailer until the drawbar enters the receiver. The receiver is provided with a locking mechanism so that when the drawbar is locked in position in the receiver the trailers are connected and ready for travel.

Referring to the drawings, FIGS. 1-3 illustrate the drag-line principle of the invention as applied to the connecting of two trailers 1 and 2 utilizing a tractor 3 as the draft vehicle. The tractor and trailers are ordinary farm equipment for hauling agricultural products, such as grain, hay, livestock or fertilizer materials. The receiver 10 is mounted on the rear axle of the first or leading trailer 1. The dragline or drawline 9 is shown as passing through the receiver and under the first trailer the free or front end accessible for connecting to the drawbar 4 of the tractor, the other end being connected to the dragline drawbar 14.

In FIG. 1, the tractor 3 and the first trailer 1 have been driven into position for the two trailers to be connected. The drawbar 4 of the tractor is still connected to the tongue 5 of the first trailer. The drawbar 14 has been removed of the receiver 10 and connected to the tongue 6 of the second trailer. It will be noted that the dragline is long enough to extend under the first trailer and to provide slack at one end for moving the drawbar 14 about and at the other end for easy connection to the tractor 3.

FIG. 2 shows the front end of the dragline 9 connected to the drawbar 4 of the tractor and the tractor advanced sufficiently so that the dragline pulls the drawbar 14 and the attached second trailer forward until the drawbar is locked in the receiver 10.

FIG. 3 illustrates the final step in utilizing the invention wherein the dragline 9 is disconnected from the tractor and the slack coiled up and fastened to the tongue of trailer 1. The tongue 5 of the first trailer is reconnected to the drawbar 4 of the tractor thereby completing the operation so that the tractor and connected trailers are ready for travel.

The details of construction of the device of the invention are shown in the enlarged views of FIGS. 4-8. The drawbar assembly is referred to generally at 10 and is mounted on the rear axle of a trailer, a fragment of the axle being shown at 11 in FIGS. 4-6. The assembly may be mounted on other types of vehicles, for example, a draft vehicle such as a tractor or truck. When mounted on a draft vehicle, it is advantageous to have the front end of the dragline attached to a hydraulic cylinder with a sheave or winch powered by the engine of the vehicle. The cylinder may be located under or on the side of the tractor and controlled by a lever. Such an arrangment has the advantage that the operator need not dismount from the tractor to disconnect the dragline as it can be permanently attached to the cylinder. Such cylinder may also be used advantageously when the drawbar assembly is attached to the rear axle of the first trailer as in FIGS. 1–3. Thus for example, instead of the front end of the dragline 9, as shown in FIG. 2, being first connected to the drawbar 4 and the tractor driven ahead to draw the second trailer into hitching position, the dragline may be attached to a cylinder on the tractor and the dragline actuated by the cylinder to pull the second trailer forward, the tractor remaining stationary. The operator of the tractor is thereby relieved of the necessity of dismounting to handle the alternate connections of the dragline 9 and the tongue 5 to the drawbar 4, since the tongue may remain connected to the drawbar at all times.

The receiver, indicated generally by the numeral 12, is a hollow, substantially rectangular, sleeve or housing having front and rear ends 13 and 15, top and bottom plates 18 and 19, and side walls 20. The receiver is secured to the axle 11 by a pair of U-bolts 16 which clamp around the axle, extend through apertures in the top and bottom plates 18 and 19, and are held by the nuts 17. The top and bottom plates are welded to the side walls at 21.

As shown in FIGS. 4 and 8, a lock having a trap door 22 for holding the drawbar 14 in locked position is located in the forward end of the top plate 18. A sheet metal dust cap (not shown) may be installed on the plate to prevent dust and gravel from entering the lock. The trap door is pivoted on a shaft 23 the ends of which are mounted in a pillow block bearing 24. One end of the shaft is bent at a substantially right angle to form a lever 25 for raising and lowering the trap door 22. A spring 26 normally urges the trap door in a closed or locking position as shown in FIG. 6, it being necessary to pull the lever 25 to open the door and release the lock. For purposes of pulling lever 25, a lock release cable (not shown) may be attached to the lever and extended to the front of the trailer.

Vertical rollers 27 fastened by bolts to the corners of the end 15 of the receiver serve as pulleys for the dragline 9 and guides for the drawbar 14. The function of the rollers in guiding the drawbar into the receiver is illustrated in FIG. 5 wherein the broken lines 28 indicate one position of the drawbar entering the receiver. The rollers straighten out the drawbar as it travels into the receiver so that it becomes parallel to the sides 20. Between the rollers 27 at the bottom of the receiver is a horizontal roller 30 providing additional pulley action and support for the dragline and drawbar. The roller 30 operates on a horizontal bolt or pin supported by bearing plates arc welded to the underside of the plate 19. Suitable rollers have been made by drilling holes in cylinders of cold rolled steel.

A vertical bar 31, welded to the top side of the drawbar 14, serves as a stop which jams against end 15 of the top plate 18. The location of the stop is predetermined so that the forward movement of the drawbar is terminated at a point where the trap door 22 will drop into the recess in the top plate 18 and lock in the notch 36 (FIG. 7). There is preferably a clearance of about one-eight inch in the notch 36 between the plate 41 and the trap door 22. For convenience in determining when the trap door is in locked position, an indicator (not shown) may be provided on the lock release cable, referred to above, at the front of the first trailer. A bar 31A resting at an agle against the bar 31 is welded at the bottom to the drawbar 14 and at the top to the bar 31. The bar 31A serves as a brace and also as a guide to direct the drawbar so that the end 15 of the top plate 18 slides into the notch 29 whereby the drawbar lies substantially parallel with the plate 18 to facilitate the action of the trap door locking mechanism.

A spacer plate 40 is welded to the upper side of the forward end of the drawbar 14 and to the underside of the clevis plate 41. One end of the spacer plate extends beyond the end of the clevis plate forming a notch 36 into which the trap door is pulled by the spring 26.

The end of the dragline cable 9 is speltered welded or leaded into a socket 32 which is cone shape to facilitate guiding into the end 15 of the receiver. A flat bar extension of the socket fits between the clevis plates and is provided with an aperture for a clevis pin 33 which secures the drawbar to the dragline. A wire rope has been found satisfactory for the dragline cable.

The rear end of the drawbar 14 is provided with an aperture for a clevis pin 35 used in connecting the drawbar to the tongue of a trailing vehicle, such tongue being shown in the drawings as tongue 6 of the second trailer.

The manner of using the invention is apparent from the drawings and the description, but for purposes of further illustration an example of the operation of the invention will now be given. The tractor is placed in front of, and in close proximity to, the tongue of the first trailer, and the tongue is attached to the drawbar of the tractor by inserting a pin through the tongue and drawbar apertures. The tractor with the first trailer attached is driven along side of, and at an angle to, the second trailer, stopping when the rear wheel of the first trailer is near the end of the tongue of the second trailer. The clevis on the end of the dragline is attached to the tractor drawbar. The lever 25 is moved forward releasing the trap door lock 22. The drawbar 14 is then drawn rearwardly and attached to the tongue of the second trailer. At this point, the dragline extends from the tractor drawbar along the tongue and frame of the first trailer to approximately 6 feet beyond the rear end of the receiver. The slack in the dragline makes it possible to connect the drawbar to the second trailer tongue within a six foot radius of the receiver. The tractor is advanced a few feet to straghten the alignment of the two trailers, and the tongue of the first trailer is disconnected from the tractor drawbar. The first trailer is maintained stationary while the tractor is driven ahead to draw the dragline drawbar into the receiver. The travel of the drawbar is terminated by the stop 31 and is locked in position by the spring-loaded trap door. The travel of the tractor is then reversed until the hitch pin can be inserted in the tongue of the first trailer and the drawbar of the tractor. The dragline is disconnected from the tractor drawbar and the slack stored and secured on the brackets on the tongue of the trailer, thereby preventing accidental release of the drawbar. The foregoing procedure can also be practiced with a hydraulic cylinder or by a power winch connected to the dragline thereby eliminating the necessity of unhooking the first trailer from the tractor.

The embodiment of the invention shown in the drawings and described herein is for purposes of illustration. Many variations may be made in the details of construction without departing from the spirit of the invention and such variations and modifications are considered as coming within the scope of the invention.

I claim:

1. A vehicle drawbar assembly for connecting a plurality of vehicles used in farming operations, including draft and trailer vehicles for travel in the field or on the road, comprising:

a hollow, substantially rectangular receiver, having open ends and flat walls at the bottom, top and sides; rollers at the rear end, adjacent the bottom and side walls, to guide a drawbar into said receiver; and a locking mechanism at the front end to lock the drawbar in the receiver;

a drawbar, substantially flat and commensurate in length with the receiver, having means at the front end for cooperating with the locking mechanism and for fastening to a dragline; and a stop at the rear end to limit the distance the drawbar enters the receiver; and a dragline for connecting the drawbar to a draft vehicle, having a single, continuous cable of sufficient length to reach from the draft vehicle to the last trailer vehicle; and means at the front end for connecting to said draft vehicle and at the rear end for connecting to the drawbar.

2. A device according to claim 1 in which the locking mechanism is a trap-door operating through a recess in the top wall of the receiver.

3. A device according to claim 1 in which the means at the front end of the drawbar for cooperating with the locking mechanism is a notch formed by an extension of a flat bar between clevis plates.

4. A device according to claim 1 in which the stop at the rear end of the drawbar is an upright bar on the top of the drawbar to jam against a plate forming the top wall of the receiver.

* * * * *